US012755646B2

(12) United States Patent
Cooper et al.

(10) Patent No.: US 12,755,646 B2
(45) Date of Patent: Oct. 6, 2026

(54) UNIVERSAL TOILET TRAINING METHOD AND APPARATUS

(71) Applicants: Michele Cooper, Short Hills, NJ (US); Justin Cooper, Short Hills, NY (US); Lynnsey Cooper, Short Hills, NJ (US)

(72) Inventors: Michele Cooper, Short Hills, NJ (US); Justin Cooper, Short Hills, NY (US); Lynnsey Cooper, Short Hills, NJ (US)

( * ) Notice: Subject to any disclaimer, the term of this patent is extended or adjusted under 35 U.S.C. 154(b) by 600 days.

(21) Appl. No.: 18/219,980

(22) Filed: Jul. 10, 2023

(65) Prior Publication Data

US 2024/0021099 A1 Jan. 18, 2024

Related U.S. Application Data

(60) Provisional application No. 63/388,284, filed on Jul. 12, 2022.

(51) Int. Cl.
*G09B 19/00* (2006.01)

(52) U.S. Cl.
CPC ................................ *G09B 19/0076* (2013.01)

(58) Field of Classification Search
CPC .................................................. G09B 19/0076
See application file for complete search history.

(56) References Cited

U.S. PATENT DOCUMENTS 4,993,085 A * 2/1991 Gibbons .............. A61G 7/1007 4/667
5,890,907 A * 4/1999 Minasian ................. A63H 3/24 446/296
5,978,976 A * 11/1999 Chai ...................... A47K 11/06 4/483
7,174,774 B2 * 2/2007 Pawar ..................... A61F 13/42 434/365
9,398,835 B2 * 7/2016 McCarthy .............. A47K 13/24
10,049,597 B2 * 8/2018 McCarthy .............. A47K 17/00
D892,284 S * 8/2020 Healy .......................... D23/296
10,736,470 B2 * 8/2020 Preece ................. A47C 13/005
10,849,821 B2 * 12/2020 Hennessy .............. A47K 3/282
11,071,413 B2 * 7/2021 Hennessy .......... A61H 33/6005
11,540,760 B1 * 1/2023 Guillemette ......... A47K 13/105
11,883,354 B2 * 1/2024 Hennessy .......... A61H 33/6021
12,171,702 B2 * 12/2024 Nomura ................... A61G 5/14
12,279,724 B2 * 4/2025 Sauceda ............... A47K 17/028
12,440,075 B2 * 10/2025 Barr ....................... A47K 13/06
D1,100,555 S * 11/2025 Gasser .......................... D6/716
12,514,414 B2 * 1/2026 Conrad, III ............ A47K 13/24
12,558,474 B2 * 2/2026 Cheng ........................ A61F 5/44
12,611,130 B2 * 4/2026 Kelly ..................... A61B 5/204
12,616,307 B2 * 5/2026 Gasser ..................... A47C 7/62
2006/0264858 A1 * 11/2006 Roe ......................... A61F 13/42 604/361
2008/0108041 A1 * 5/2008 Dial ........................ G09B 19/00 434/365
2011/0131718 A1 * 6/2011 Smith .................... A47K 11/06 4/483
2013/0086737 A1 * 4/2013 Bizar ..................... A47K 11/02 4/484

(Continued)

*Primary Examiner* — Xuan M Thai
*Assistant Examiner* — Sadaruz Zaman
(74) *Attorney, Agent, or Firm* — Philip M. Weiss; WEISS & WEISS

(57) ABSTRACT

A device and method for teaching a child or person having cognitive delays how to wipe their buttocks.

20 Claims, 4 Drawing Sheets

(56) References Cited

U.S. PATENT DOCUMENTS

| | | | | |
|---|---|---|---|---|
| 2014/0127657 | A1* | 5/2014 | Traxler | G09B 19/0076 434/247 |
| 2018/0233063 | A1* | 8/2018 | Totah | A63H 3/005 |
| 2019/0216276 | A1* | 7/2019 | Conrad | A47K 13/24 |
| 2021/0322201 | A1* | 10/2021 | Tate | A61G 7/07 |
| 2024/0021099 | A1* | 1/2024 | Cooper | G09B 19/0076 |
| 2024/0115459 | A1* | 4/2024 | Hennessy | A61H 33/6021 |
| 2025/0107967 | A1* | 4/2025 | Hennessy | A61H 35/006 |
| 2025/0367041 | A1* | 12/2025 | Swanson | A61F 13/495 |

* cited by examiner

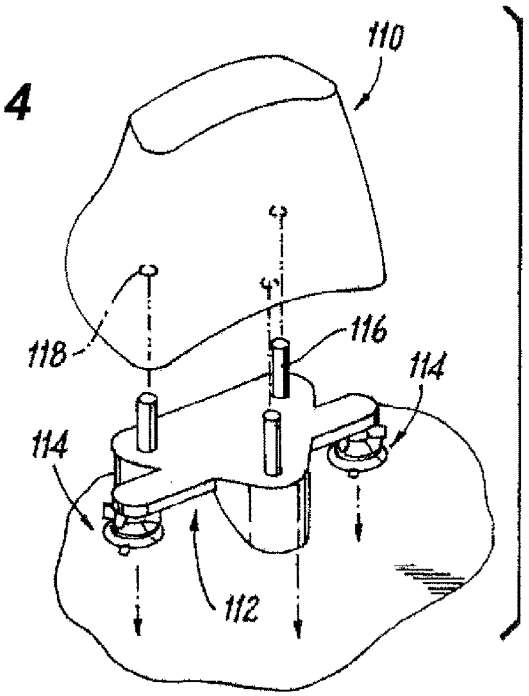
Fig. 4
Fig. 5
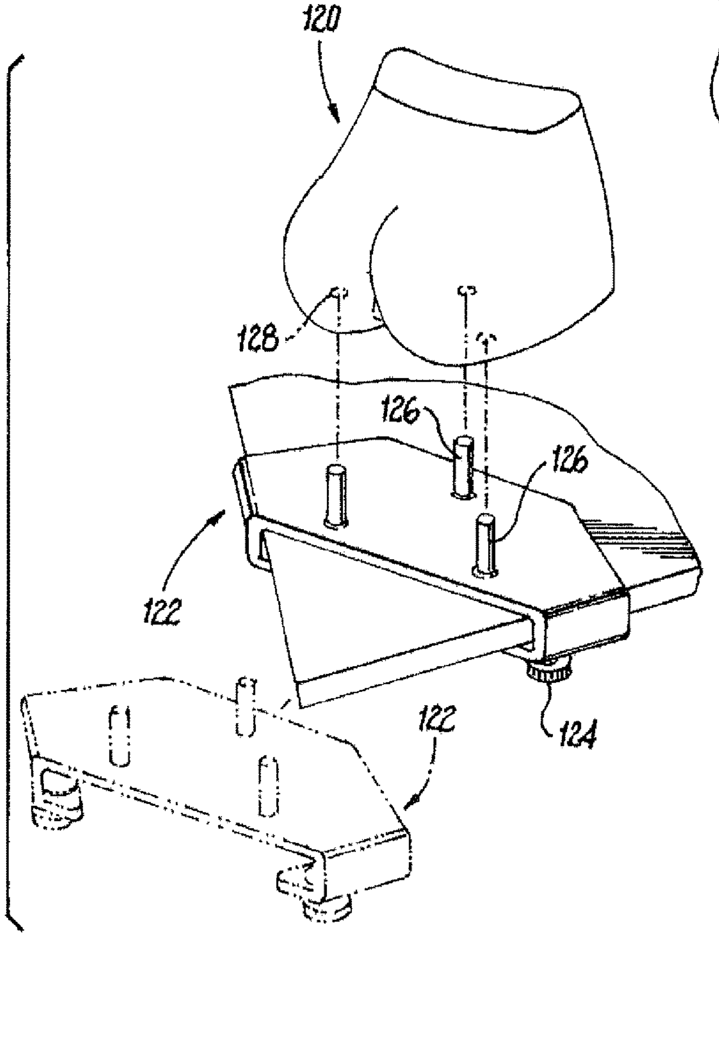
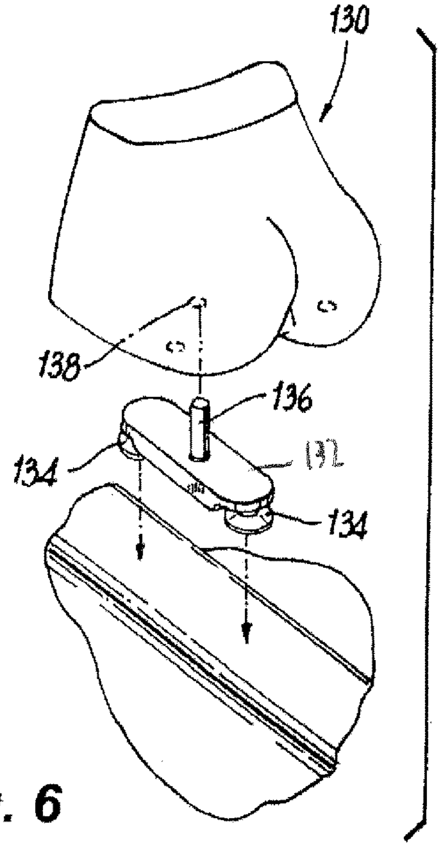
Fig. 6

Fig. 7
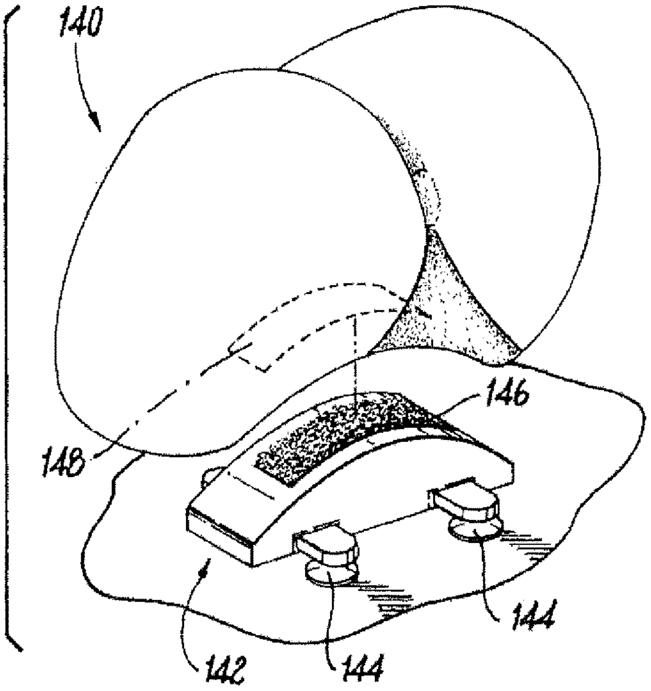
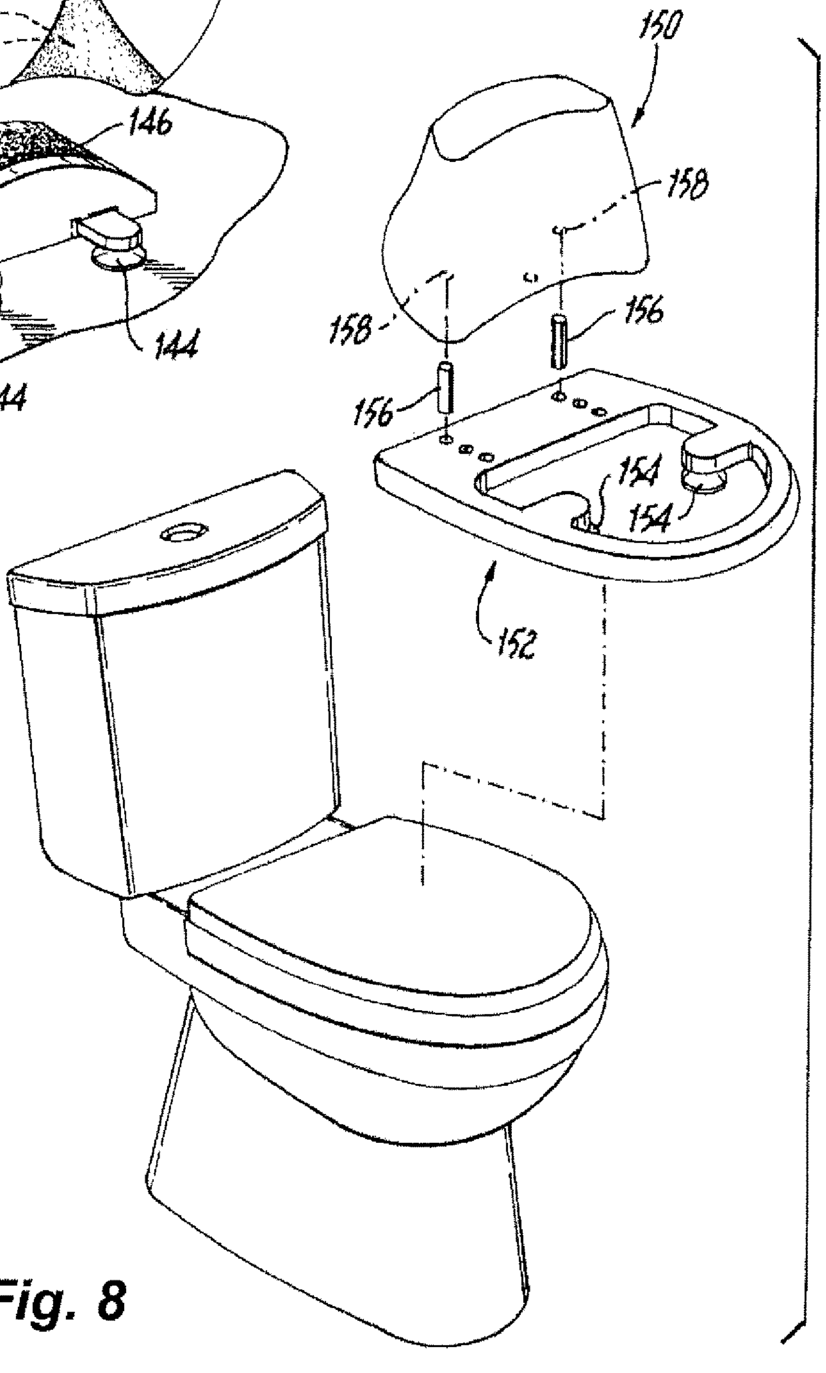
Fig. 8

UNIVERSAL TOILET TRAINING METHOD AND APPARATUS

CROSS REFERENCE TO RELATED APPLICATIONS

This application claims priority to and benefit of U.S. Provisional Patent Application Ser. No. 63/388,284 dated Jul. 12, 2022.

FIELD OF THE INVENTION

The present invention relates to a device that teaches an individual including, but not limited to, a child or person having cognitive delays how to wipe their buttocks.

BACKGROUND OF THE INVENTION

One of the hardest parts of toilet training is learning how to wipe one's own buttocks after a bowel movement. The typical steps to instruct a person (e.g., a toddler) include first showing the individual how to hold a wipe flat in their hand (i.e., not into a ball), and walking them through the process of wiping, folding, wiping, folding, wiping, etc. until they don't see anything on the wipe anymore. That's how they'll know they are finished and ready to flush.

Unfortunately, teaching in the abstract is not so easy when an individual has cognitive delays or deficits. Studies suggest that it may take a typical person 25 attempts to learn a new skill, while it may take at least 250 attempts for a person with Autism or other cognitive delay to learn or relearn that same skill. Since the average person has a bowel movement anywhere between three times a week and three times a day, these studies would suggest that a typical person could learn to wipe their own buttocks in approximately 8⅓ weeks. However, the same study would suggest that it could take a person with Autism 83⅓ weeks to learn the same skill.

SUMMARY OF THE INVENTION

The present invention enables an individual to practice the skill of wiping their buttocks at any time by providing access to the activity without the need to go to the toilet or remove ones clothes.

The present invention comprises a buttocks simulator that can be placed on a table or other smooth surface and used with imitation feces. It is an object of the present invention for the buttocks simulator to be used with a stand, seat of other stabilizing device. It is an object of the present invention for the buttocks simulator to have an attachment mechanism to attach to a stand, table, seat or surface. It is an object of the present invention for the attachment mechanism to include, but not be limited to suction cups, clips, screws, snaps, clamps, clasps, Velcro, etc. It is an object of the present invention for the stand to have attachment pieces which can be attached at attachment points in the buttocks simulator.

It is an object of the present invention for the stand to have an attachment mechanism that allows for the device to be affixed to a table, chair, stand or other stabilizing device.

It is an object of the present invention for the stand to attach to a bathtub wall. It is an object of the present invention for the stand to be attached by a mechanism such as suction cups, clips, screws, snaps, clamps, clasps, Velcro, etc.

It is an object of the present invention for the stand and the buttocks simulator to be attached by hooks and loops.

The present invention relates to a portable toilet training device comprising a buttocks simulator and a seat. It is an object of the present invention for the seat to comprise suction cups 154 that are used to attach to a surface, such as the top of a closed toilet seat. It is an object of the present invention for the seat to have attachment pieces attached to attachment points on the buttocks simulator.

The present invention relates to a toilet training device that comprises a buttocks simulator co-molded with a potty seat.

The present invention relates to a standing toilet training device having a seat portion having legs attached to a stand portion. It is an object of the present invention for the seat portion to have holes which have attachment pieces that attach the seat to the buttocks simulator.

The present invention relates to a toilet training device, as well as a method for training a learner to practice wiping the buttocks.

A trainer can practice on the device using toilet paper and then teach the user how to tear the toilet paper in squares, wrapping it around the hand and then wiping the buttocks. The person then checks the toilet paper to see if it is dirty, and if it is dirty it is thrown away. These steps are then repeated.

The toilet training device comprises a combination of two main components: a horizontal platform having a round or oval seating area with an open center (similar to a toilet seat), and a buttocks simulator, shaped like the human buttocks, perpendicularly affixed to the top side of the horizontal platform. It is an object of the present invention for the buttocks simulator to be constructed out of latex or some other material that resembles the feel and movement of a human's buttocks. In a further embodiment, the buttocks simulator comprises a harder plastic.

The present invention relates to an individual sitting on the horizontal platform and reaching behind himself/herself, using toilet paper to wipe a substance (imitation feces) that is located between the cheeks of the buttocks simulator, until such time as the wiping yields a clean piece of toilet paper.

In another embodiment, the toilet training device is initially placed on a table. Imitation feces is applied between the cheeks of the toilet training device. Imitation feces may be made from various materials, such as flour, water, salt and food coloring as well as other materials known in the art (see, e.g., https://www.instructables.com/Fake-poop/). Preferably, the imitation feces will not have a pleasant odor or taste.

By seeing the toilet training device on the table in front of him/her, the learner can visually see the process of what wiping his/her own buttocks will look like. Since the toilet training device is very similar to a real buttocks (visually, physically and tactilely), he/she will be able to experience what it would actually feel like to wipe his/her own buttocks.

In another embodiment, the learner will sit on a chair with the toilet training device attached. The imitation feces will be applied between the cheeks of the buttocks simulator. By using the toilet training device, the learner is practicing in as close to a real-life situation as possible without worrying about teaching the skill in unsanitary conditions. The device gives him/her the opportunity to practice reaching around to wipe a bottom.

By using the device, the learner can then learn to wipe his/her actual bottom on an actual toilet.

BRIEF DESCRIPTION OF THE DRAWINGS

FIG. 4 is a rear perspective view with parts separated of the training device of FIG. 1, but having a base with rotational suction cups.

FIG. 5 is a front prospective view of the training device of FIG. 1, but having a base with clamping for fixation to a table corner.

FIG. 6 is a front perspective view of the training device of FIG. 1, but having a mounting base with suction cups for affixing to a bathtub wall.

FIG. 7 is a front perspective view with parts separated of a further embodiment, wherein the training device has an upward orientation and an arcuate bottom surface and is affixed with hook and loop tape to an arcuate base.

FIG. 8 is a perspective view of a further embodiment wherein the training device is selectively mounted to a seat-shaped base, with the based being mounted to a toilet seat cover by suction cups.

DETAILED DESCRIPTION

Figure 1:
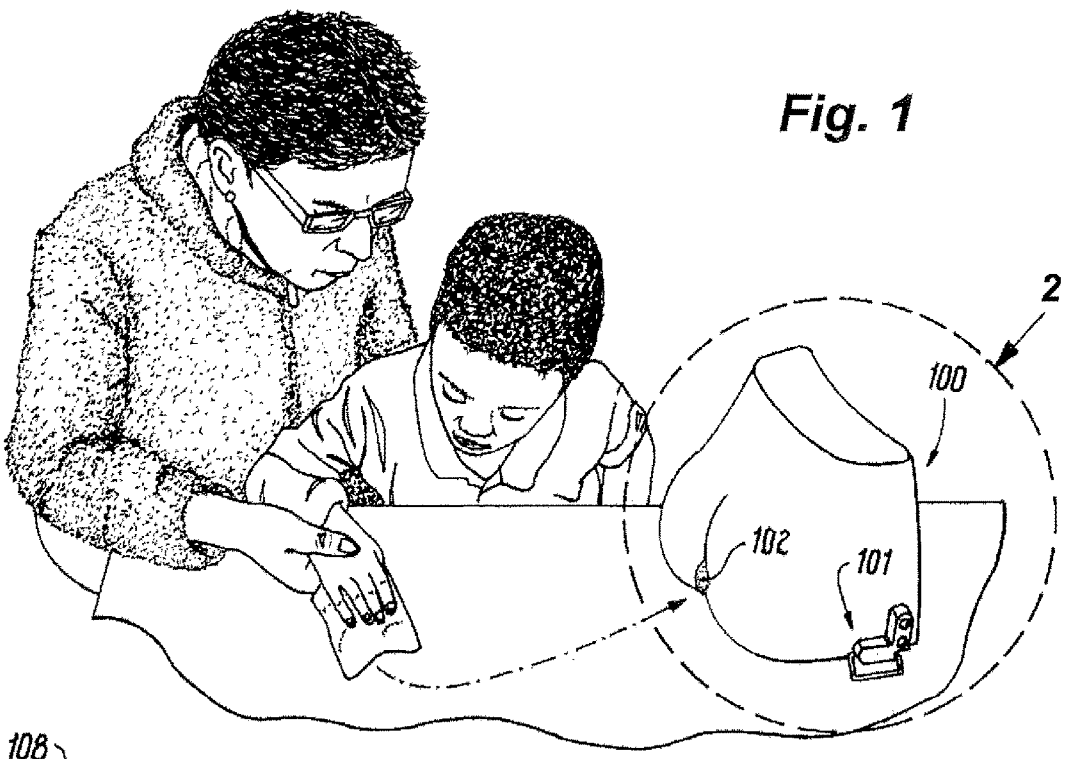
FIG. 1 is a perspective view of a trainer assisting a learner in the grasping of toilet paper, in anticipation of utilizing a first embodiment of the training device.

FIG. 1 shows a buttocks simulator 100 having an attachment mechanism 101 placed on a table having an imitation feces 102.

Figure 2:
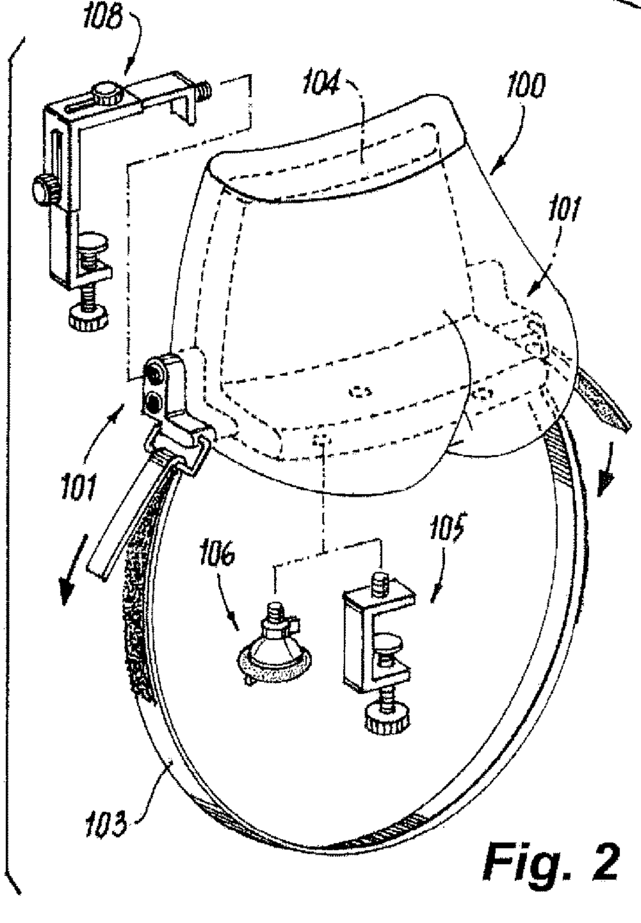
FIG. 2 is a front view of the device showing different parts for attaching the device to a surface.

FIG. 2 shows a buttocks simulator 100 having an attachment mechanism 101 on each side of the simulator 100 that can be used with a clamping mechanism 108 or a buckle mechanism 103. The simulator 100 can also bee attached to a surface by a clamping mechanism 105 or suction mechanism 106.

Figure 3:
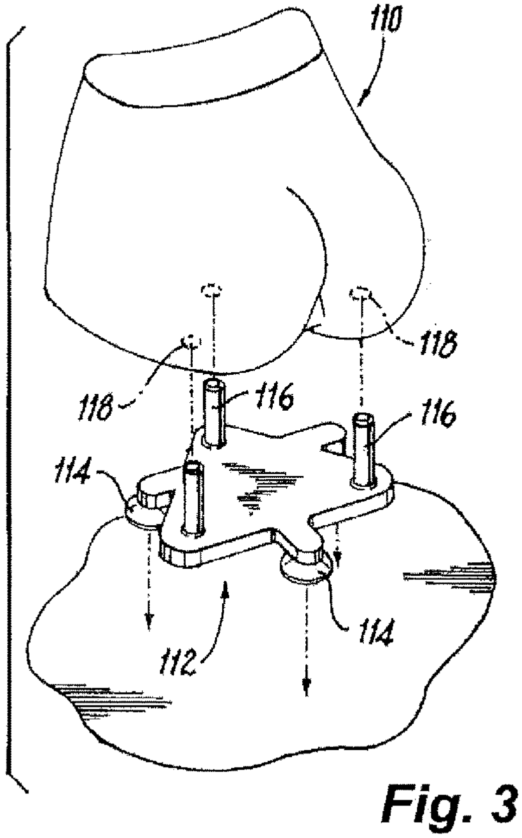
FIG. 3 is a front perspective view with parts separated of the training device of FIG. 1, having a base with suction cups.

FIG. 3 shows a front view of the buttocks simulator 110 and a stand 112. The stand 112 has suction cups 114 which attach it to a table or other surface. The stand 112 has attachment pieces 116 attached at attachment points 118 in the buttocks simulator 110.

FIG. 4 shows a rear view of the buttocks simulator 110 and a stand 112. The stand 112 has suction cups 114 which can attach it to a table or other surface. The stand 112 has attachment pieces 116 which attach to attachment points 118 in the buttocks simulator 110.

FIG. 5 shows a front view of the device having the buttocks simulator 120 and a stand 122. The stand 122 is attached to a surface, such as the corner of a table by a clamping mechanism 124. The stand has attachment pieces 126 attached to attachment points 128 in the buttocks simulator 120.

FIG. 6 shows a front view of the device having the buttocks simulator 130 and a stand 132. The stand is attached to a surface, such as a bathtub wall, by suction cups 134. The stand has attachment pieces 136 attached to attachment points 138 in the buttocks simulator 130.

FIG. 7 shows a front view of a buttocks simulator 140 and a stand 142. The stand is attached to a table or other surface by suction cups 144. The stand then has hooks 146 that are attached to loop tape 148 on the buttocks simulator 140.

FIG. 8 shows a portable toilet training device that is made up of a buttocks simulator 150 and a seat 152. The seat 152 has suction cups 154 that are used to attach to a surface, such as the top of a closed toilet seat. The seat 152 has attachment pieces 156 that are attached to attachment points 158 on the buttocks simulator 150.

Figure 9:
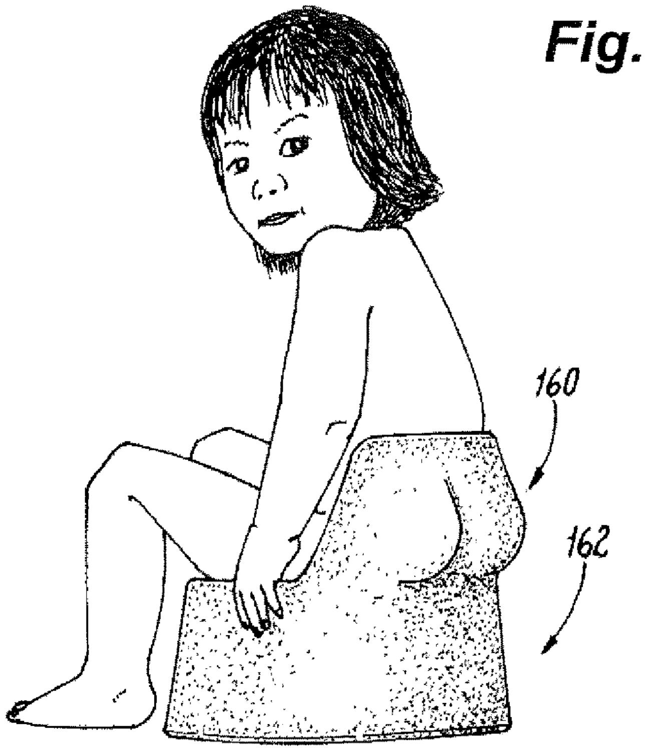
FIG. 9 is a perspective view of a learner seated on a further embodiment of the toilet training device, wherein the training device is co-molded with a potty chair.

FIG. 9 shows the toilet training device that has the buttocks simulator 160 co-molded with a potty seat 162.

Figure 10:
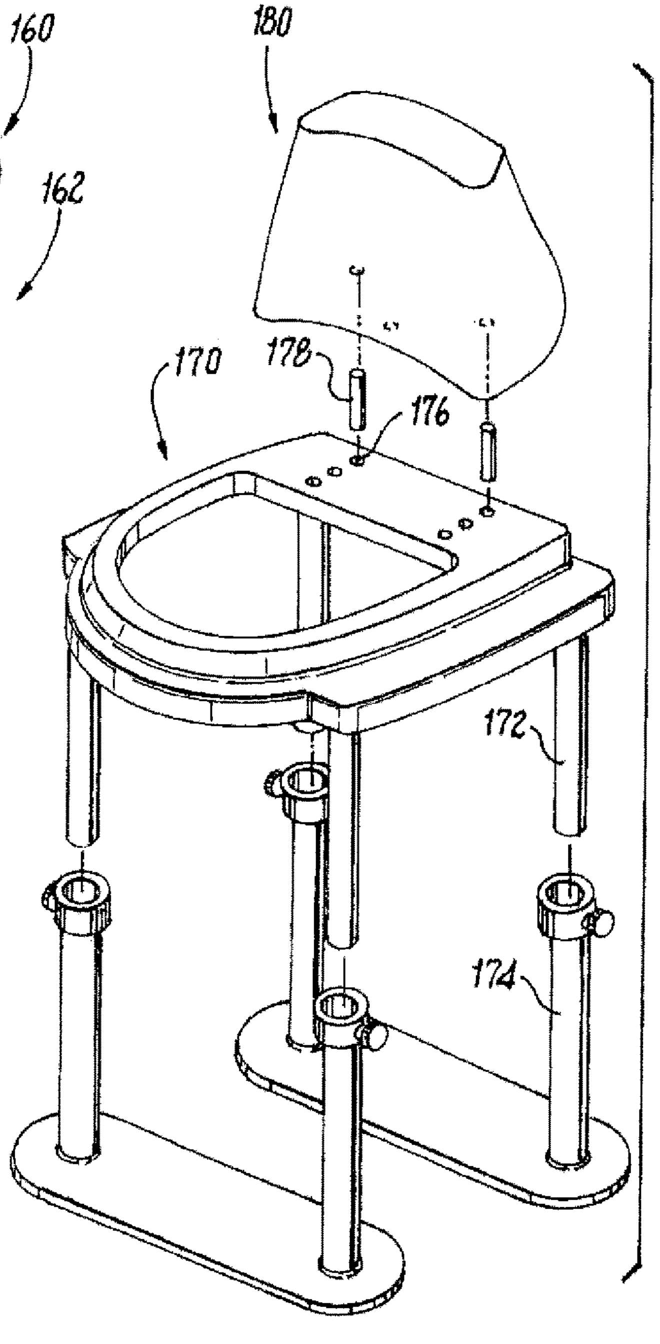
FIG. 10 is a perspective view of a further embodiment of the toilet training device, wherein the training device is selectively mountable to a seat-shaped based having height-adjustable legs.

FIG. 10 shows a standing toilet training device having a seat portion 170 having legs 172 attached to a stand portion 174. The seat portion has holes 176 which have attachment pieces 178 that attach the seat 170 to the buttocks simulator 180.

A preferred embodiment of the present invention implements a toilet training device, as well as a method for training a learner to practice wiping the buttocks.

A learner can visually see the process of what wiping his/her own buttocks looks like by seeing the toilet training device of the present invention on the table in front of him/her. The user goes from seeing the device in front of them to placing the device behind them to learn how to wipe their bottom. The device gives him/her the opportunity to practice reaching around to wipe a bottom. By using the device, the learner can then try to wipe his/her actual bottom on an actual toilet.

The invention claimed is:

1. A device for teaching a user how to wipe their buttocks comprising:
- a buttocks simulator;
- said buttocks simulator shaped like the human buttocks;
- said buttocks simulator constructed out of a material that resembles feel and movement of a human's buttocks;
- said buttocks simulator placed on a table or other smooth surface;
- said buttocks simulator used with a stand, seat or other stabilizing device;
- said buttocks simulator further comprising an attachment mechanism to attach to said stand, table, seat or surface.

2. The device of claim 1 wherein said attachment mechanism comprises cups, clips, screws, snaps, clamps, clasps, or hooks and loops.

3. The device of claim 1 wherein said stand comprises attachment pieces which are attached at attachment points in said buttocks simulator.

4. The device of claim 1 wherein said device enables an individual to practice wiping their buttocks at any time by providing access to the activity without the need to go to the toilet or remove ones clothes.

5. The device of claim 1 wherein said the stand attaches to a bathtub wall.

6. The device of claim 5 wherein said stand attached to said bathtub wall by a mechanism such as suction cups, clips, screws, snaps, clamps, clasps, or hooks and loops.

7. The device of claim 1 wherein said stand and buttocks simulator are attached by hooks and loops.

8. The device of claim 1 wherein said device has a base with clamping for fixation to a table corner.

9. A portable toilet training device comprising:
- a buttocks simulator and a seat;
- said seat comprising suction cups used to attach to a surface;
- said seat comprising attachment pieces that are attached to attachment points on said buttocks simulator;
- said buttocks simulator shaped like the human buttocks;
- said buttocks simulator constructed out of a material that resembles feel and movement of a human's buttocks.

10. The device of claim 9 wherein said device attaches to top of a closed toilet seat.

11. The device of claim 8 wherein said buttocks simulator is co-molded with a potty seat.

12. A standing toilet training device comprising:

a buttocks simulator;

said buttocks simulator shaped like the human buttocks;

said buttocks simulator constructed out of a material that resembles feel and movement of a human's buttocks;

a seat portion having legs attached to a stand portion;

said seat portion to have holes which have attachment pieces that attach said seat to said buttocks simulator.

13. A toilet training device comprising:

a combination of a horizontal platform having a round or oval seating area with an open center, and a buttocks simulator shaped like the human buttocks;

said buttocks simulator perpendicularly affixed to top side of said horizontal platform;

said buttocks simulator constructed out of latex or some other material that resembles feel and movement of a human's buttocks.

14. The toilet training device of claim 13 wherein said buttocks simulator comprises a hard plastic.

15. The toilet training device of claim 13 wherein an individual sitting on said horizontal platform can reach behind himself/herself, and feel said buttocks simulator.

16. The device of claim 1 wherein said device has an upward orientation and an arcuate bottom surface and is affixed with hook and loop tape to an arcuate base.

17. The device of claim 1 wherein said device is selectively mounted to a seat-shaped base, with the base being mounted to a toilet seat cover by suction cups.

18. The device of claim 1 wherein said device is selectively mountable to a seat-shaped base having height-adjustable legs.

19. A toilet training device comprising:

a buttocks simulator;

said buttocks simulator shaped like the human buttocks;

said buttocks simulator constructed out of a material that resembles feel and movement of a human's buttocks;

an attachment mechanism on each side of said simulator;

said attachment mechanism used with a clamping mechanism or strap to attach to a surface.

20. A toilet training device comprising:

a buttocks simulator;

said buttocks simulator shaped like the human buttocks;

said buttocks simulator constructed out of a material that resembles feel and movement of a human's buttocks;

said simulator attached to a surface by a clamping mechanism or suction mechanism.

* * * * *